United States Patent
Carl et al.

(10) Patent No.: US 6,805,558 B1
(45) Date of Patent: Oct. 19, 2004

(54) FREE FALL AND GAME SIMULATOR

(76) Inventors: David Carl, 16 Hunter's Green Cir., Little Rock, AR (US) 72211; Nathan Gershon, 16 Hunter's Green Cir., Little Rock, AR (US) 72211

( * ) Notice: Subject to any disclaimer, the term of this patent is extended or adjusted under 35 U.S.C. 154(b) by 301 days.

(21) Appl. No.: 09/716,045

(22) Filed: Nov. 20, 2000

(51) Int. Cl.[7] .......................... G09B 9/00; A63G 31/00
(52) U.S. Cl. ........................ 434/258; 35/247; 473/415; 472/49; 472/137; 73/147
(58) Field of Search .................. 73/147; 472/49, 472/50; 434/44, 258, 29, 30, 34, 35

(56) References Cited

U.S. PATENT DOCUMENTS

| | | | | |
|---|---|---|---|---|
| 2,538,910 A | * | 1/1951 | Miller .......................... | 348/157 |
| 3,484,953 A | * | 12/1969 | Norheim ...................... | 434/247 |
| 4,457,509 A | * | 7/1984 | St-Germain .................. | 434/258 |
| 4,535,983 A | * | 8/1985 | De-La-Concha-Caceres ....................... | 472/137 |
| 4,578,037 A | * | 3/1986 | Macangus et al. ........... | 434/247 |
| 4,699,484 A | * | 10/1987 | Howell et al. ............... | 352/132 |
| 4,700,565 A | * | 10/1987 | Albuschkat .................. | 472/137 |
| 5,209,702 A | * | 5/1993 | Arenas ........................ | 434/238 |
| 5,420,626 A | * | 5/1995 | Lawrence et al. ............ | 348/44 |
| 5,593,352 A | * | 1/1997 | Methfessel et al. .......... | 434/258 |
| 5,655,909 A | * | 8/1997 | Kitchen et al. ............... | 434/43 |
| 5,753,811 A | * | 5/1998 | Consolini .................... | 472/50 |
| 6,042,490 A | * | 3/2000 | Lenhart ....................... | 473/415 |
| 6,083,110 A | * | 7/2000 | Kitchen et al. ............... | 434/34 |
| 6,085,195 A | * | 7/2000 | Hoyt et al. ................... | 396/2 |
| 6,139,439 A | * | 10/2000 | Ure ............................. | 434/258 |
| 6,315,672 B1 | * | 11/2001 | Gillot et al. ................. | 434/247 |
| 6,378,361 B1 | * | 4/2002 | Larsen et al. ................ | 73/147 |

FOREIGN PATENT DOCUMENTS

GB         2062557 A  *  5/1981  ........... B64D/23/00

* cited by examiner

Primary Examiner—Derris H. Banks
Assistant Examiner—Dmitry Suhol
(74) Attorney, Agent, or Firm—Dennis B. Haase

(57) ABSTRACT

A multi faceted system for simulating free flight, playing games in a free flight mode, and photographing the experience in a manner which permits of the creation of a montage, in which a vertical air column is defined by a variable cylindrical walls, and in which at least a portion of the air column is moving in laminar flow mode.

1 Claim, 2 Drawing Sheets

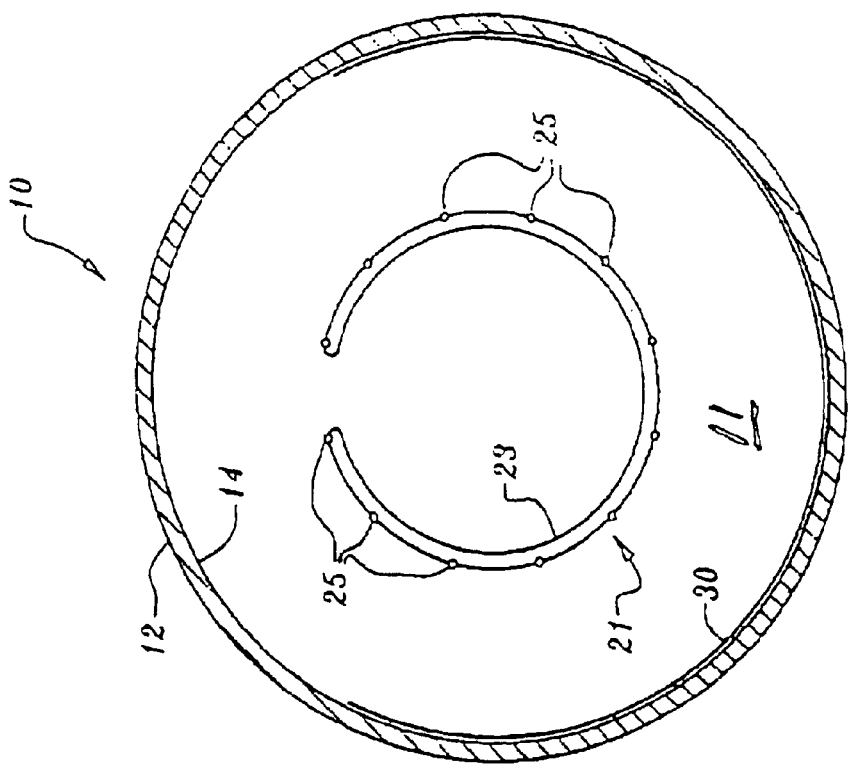
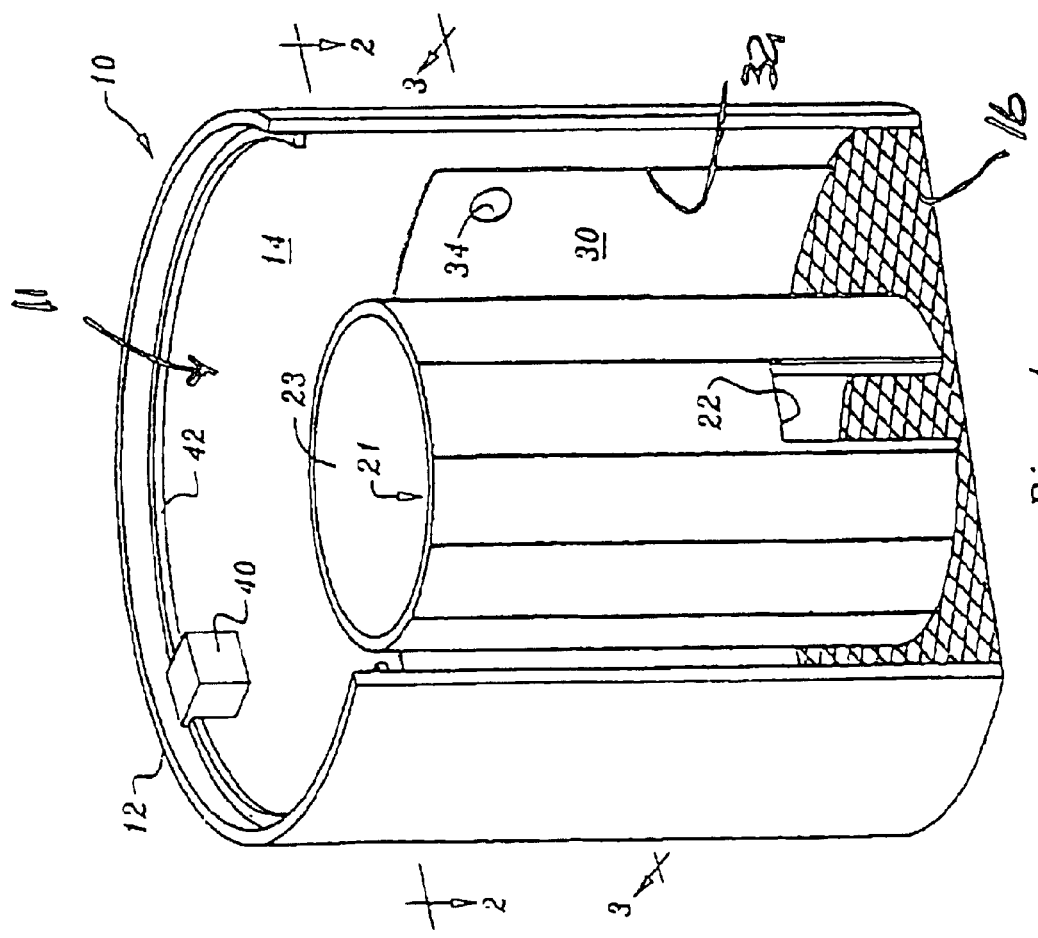

FREE FALL AND GAME SIMULATOR

The present invention relates, in a general sense, to a device for creating a vertically disposed air current capable of suspending one or more humans within the current, but, more importantly, a multi-faceted system for both the training and entertainment of members of the public who wish to experience the exhilaration of free fall flight in any one of several selected simulated environments, including, but not limited to, the capacity to play games in a state of free flight suspended animation.

BACKGROUND OF THE INVENTION

1. Field of the Invention

There is an innate aura of excitement and anticipation, particularly in the minds of the American public, surrounding the sensation of weightlessness which accompanies a free fall from significant heights. Unfortunately, there are few, if any, facilities which permit one to satisfy this appetite in a safe and reasonably economical environment. There are, of course, facilities which teach and otherwise foster the sport of sky diving. However, such facilities are inordinately expensive, primarily because of the nature of the equipment required, the cost of operation and the attendant risks. Clearly, exiting an airplane at 10,000 feet or more poses an element of real danger to the student.

Alternatively, for the feeling of weightlessness, or suspended animation, one may find, from time to time, a touring carnival which features, as part of its menagerie, a barrel-type device which is rotatable, while folks line the perimeter, and which relies on centripetal force to suspend the participant against the side wall of the barrel while the floor is lowered so as to offer no supplemental support. Such devices are poor substitutes for the sensation of flight that most of those who seek such thrills hope to emulate.

2. Overview of the Prior Art

While the art is rife with efforts to create a device that will simulate the weightlessness of the skydiving experience, there are few that attempt to create a virtual environment which stimulates one's senses to the extent that he will experience a sense of free fall without the attendant dangers.

An example of such an effort may be found in Kitchen et al. U.S. Pat. No. 5,655,909. In Kitchen, an otherwise conventional wind tunnel is enhanced by use of a projection screen covering approximately 120° of the side wall of the tunnel, which operates in concert with a series of several projectors, controlled by a transmitter on a back pack strapped to the user's body, to emulate clouds or the like, and, by such, creating the illusion of free fall from a substantial altitude. The nature of the equipment required to maintain the illusion which Kitchen envisions, is both awkward and cumbersome, and the number of flyers who may enjoy the experience simultaneously, is severely limited.

As an aside, but of no particular relevance, a second patent was issued, this time to another Kitchen et al, U.S. Pat. No. 6,083,110.

Further, it appears rather clearly that the intent and purpose of Kitchen is training, in that the projectors are intended to create virtual emergencies from which the student can recover on a step-by-step basis. Further, the student needs to have sufficient control over his or her attitude to remain in view of the projection screen, or the intent and purpose of Kitchen et al. is lost.

As previously stated, there is an abundance of art directed to wind tunnel configurations, ranging from the more current, among them including Consolini patent U.S. Pat. No. 5,753,811; Lenhart patent U.S. Pat. No. 6,042,490; Methfessel patents U.S. Pat. Nos. 5,593,352, and 5,209,702 to the earlier efforts, among them, Olshevsky patent U.S. Pat. No. 1,811,364; Hastings patent U.S. Pat. No. 2,799,460 and Norheim Jr, patent U.S. Pat. No. 3,484,953. It will be appreciated that the earliest of the patents were directed to testing apparatus for aircraft, although in 1969, Norheim, Jr. envisioned a device for simulating free fall for humans.

The Lenhart patent, which appears to be the most recent entry, discloses a massive system that supports as many as a dozen players on an air cushion, divided into teams to play a ball game. The system is huge and would require an enormous amount of power, at a not insignificant cost, to create the air cushion, making it impractical, if not impossible, to build.

There are, of course, several patents issued in the '80s, but those located do not appear to bear on the patentability of the present invention.

SUMMARY OF THE INVENTION

The present invention relates to a convertible chamber in which a vertical column of air is created which is sufficient to suspend at least two persons, sometimes referred to as flyers, in the chamber, while permitting those suspended to move within the column to simulate free fall conditions, and/or play a game, as the persons elect.

Additionally, the walls of the chamber are of such color, e.g., blue or green, and of such material, that one may video tape or film the activity in the chamber against the side walls, to create a base or primary film. Thereafter, by use of Blue Screen technology on the primary film, which is a well known technique for imposition of an image, or images, on the background created by the wall, a fantasy may be created. For example, a war scene with fighter planes and bursting bombs might create the sensation of the flyer suspended in the middle of a battle.

Consistent with the invention, it is an objective to create an enclosure which is variable in diameter, in which one might experience a variety of free fall maneuvers, both by "feel", in relative safety, and at a cost which renders such an experience accessible to almost anyone who would wish to give it a try.

It is a further objective, consistent with the foregoing, to provide an interactive enclosure that can serve both as an amusement and a serious training facility.

A still further objective of the present invention is to provide a system as described, wherein an inner chamber is removably positioned in order to vary the diameter of the chamber in order to accommodate a specified a number of flyers.

Yet another objective of the present invention is to create an atmosphere from which a subsequent video tape may be fabricated by superimposing a variety of images on the side walls of the chamber, with the result that a taped scene or sequence may be provided for later use in film productions, or simply for the entertainment of the flyer and friends.

Other objects and advantages derived from the use of the present invention will occur to those skilled in the art from a study of the following detailed description thereof, taken in conjunction with the drawings, wherein:

BRIEF DESCRIPTION OF THE ACCOMPANYING DRAWINGS

FIG. 1 is a pictorial view of a free fall simulator constructed in accordance with the present invention, with portions removed in order to more accurately depict the interrelationship of the principal elements of the construction;

FIG. 2 is a top plan view of the free fall simulator, as it is configured for purposes of FIG. 1; and, FIG. 3 is a side elevation of the free fall simulator of FIG. 1, sectioned along line 3—3 thereof, in order to provide a different perspective of the various elements.

DESCRIPTION OF A PREFERRED EMBODIMENT

Figure 3:
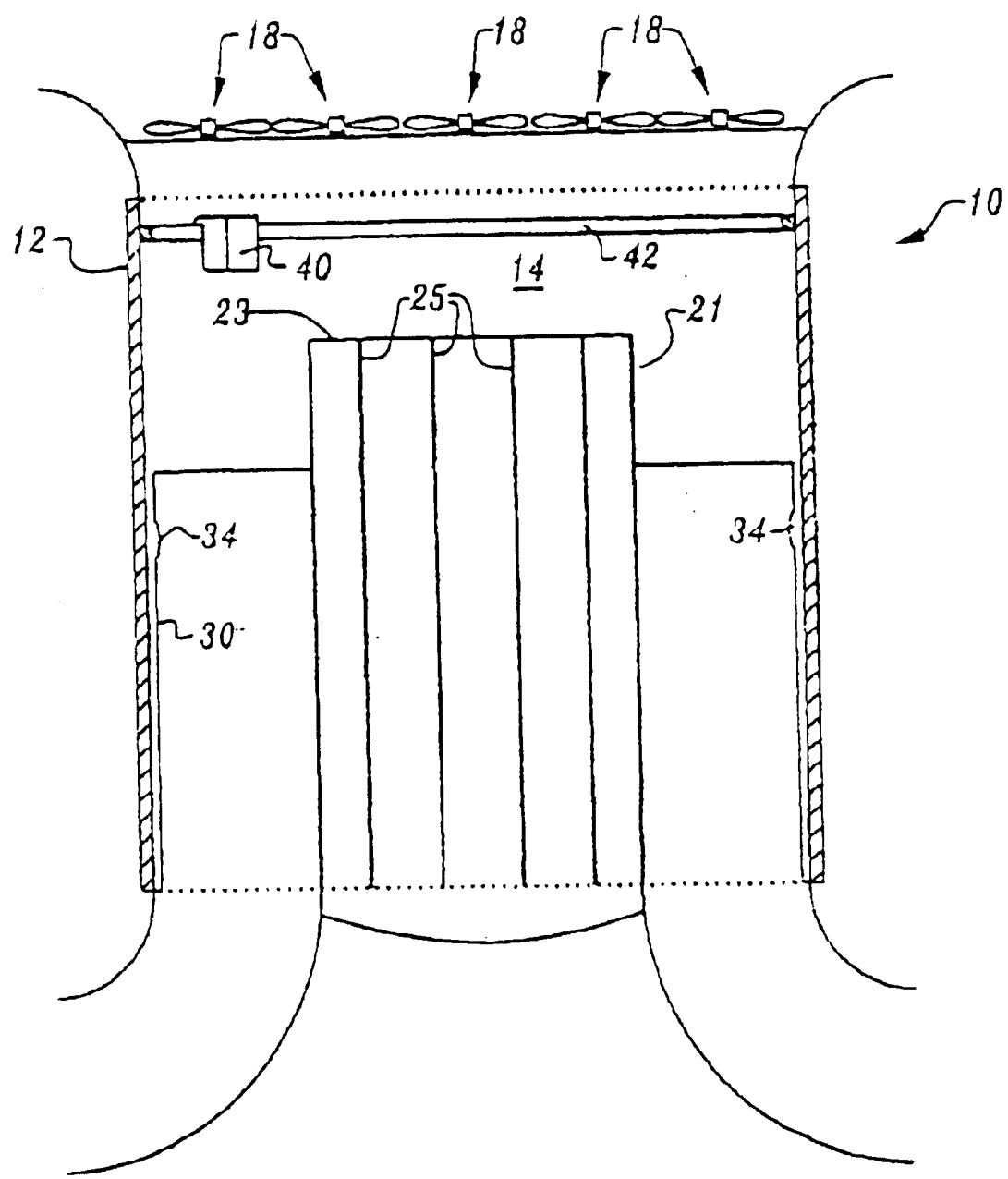

With reference now to the drawings, and with particular attention being directed initially to FIG. 1, a novel free fall simulator system embodying the salient features of the present invention is there denominated by the numeral 10.

A primary working chamber 11 for the system is defined by a primary wall 12 having a generally circular curvature, inscribing a cylinder through which a column of air under pressure is forced, the diameter of said column being changeable, as readily envisioned in FIG. 2. The wall, initially the primary wall, sometimes referred to as the outer wall 12, which defines the diameter of the column of air has an inner surface 14 which, in furtherance of the purposes of the invention, is smooth such that there are no appreciable impediments to air flow, thereby permitting laminar flow conditions in at least a lower portion of the air column. As previously alluded to, the system is motivated by a vertical column of air moving with sufficient pressure to support the weight of one to several objects such as persons simulating free fall activity.

As best seen in FIG. 1, the primary, or as sometimes referenced, the primary wall, sits on a screen 16. The screen 16 is fabricated of any one of several readily available high strength materials capable of supporting significant loads, typically comprising one to several persons using the system together with the chamber walls as described.

Disposed within the system 10, in serially spaced relation, is a sub system comprising one or more contiguous air current generator devices, e.g., fans 18. The fans 18 may be positioned above the chamber, or beneath the screen, depending on construction preference, so long as the fans 18 are so positioned as to generate a vertical airstream within the chamber which is both laminar in flow and strong enough to support the number of flyers in the chamber at any given time. It is within the contemplation of the invention that the fans are individually controllable to match the needs of the chamber depending upon its diameter for any given usage.

By generating a column of air upstream of the flyer(s) that is moving in laminar flow, there is a minimal amount of burble, or turbulence, which may adversely effect the flyer's, or flyers', control of his or her flight as well as detract from the overall experience. The very presence of the flyer(s) in the column of air may well cause turbulence, but such turbulence would tend to be downstream, or as shown, above the position of the flyer(s).

The pressure generator system which creates and sustains the vertical column of air within the chamber may be of a closed type, or open, depending on several factors. If, for example, the weather tends to be cold, or rainy, or both, a closed system is recommended wherein the airstream is completely enclosed, and once beyond the edge of the outer wall 12, is guided, by any number of suitable means, well illustrated in the prior art, back through the system to the fans.

Where temperatures and weather conditions are more temperate and more predictable, an open system may be appropriate and somewhat less costly. In such a system, fresh air is drawn into the system and discharged to the atmosphere downstream of the flyers.

One of the distinguishing features of the present invention is the ability to adjust or vary the diameter of the chamber to accommodate the number of flyers that may wish to participate in unison. Thus, where a smaller than usual number of participants are joined, energy is saved by the creation of a smaller column of moving air.

To accomplish this, the invention contemplates the creation of a smaller diameter inner chamber, which may be defined by the insertion of a secondary, or curtain wall 21, centrally, or more particularly concentrically within the primary chamber. As is well illustrated in the drawings, the curtain wall 21 is of lesser diameter than the primary chamber and may be any one of several diameters. By using the curtain wall, fans disposed between the perimeter of the secondary wall 21 and the primary wall 14 may be turned off, or where needed, their flow redirected inwardly, in any of several different well known ways. Thus, the amount of power required to generate the appropriate air column is optimized, and the cost of operation proportionately reduced. Ingress and egress to the inner chamber is accomplished through the passage 22.

In keeping with the objective of maintaining essentially laminar flow at the flyer position, the inner surface 23 of the curtain is smooth so as to minimize, if not eliminate, any incursion into the airstream. In order, however, to be sure that the curtain wall remains stable and does not decline into a wavy surface due to small pressure differentials, support is provided for the curtain 21 in the form of poles or posts 25. These supports are semi rigid and are disposed in the curtain wall 21 so that no part of the pole is protruding into the air stream, nor does its presence create a bulge therein.

Appropriate arrangements are provided for securing the poles' top and bottom for ease in setting up the inner chamber and assuring that it does not inadvertently collapse about a flyer. Cups, not shown, for securing the remote ends of the poles 25 would be one such means, although many well known such devices are within the contemplation of the invention.

While the focus of the present invention has been on fun, there is a serious side which is capable of being exploited. Indeed, the present invention provides an avenue for significant income generation well beyond what might be anticipated based on an individual fee basis.

To this end, and in accomplishing this objective, the inner wall surfaces, in addition to being smooth, are of a pastel color, e.g., blue or green. By so doing, the walls become susceptible to the application of Blue Screen technology, and the system thus a potential profit center.

Specifically, the invention contemplates the capacity to tape the flight of a flyer against the background provided by one of the inner walls 14 or 30. To this end, one or more cameras 40 are movably mounted on a track 42 and may be remotely controlled in any one of several well known manners to film or tape the events within the chambers.

Thereafter, using Blue Screen technology, other images such as, for example, clouds, aircraft in flight, other flyers and myriad other life like moving images can be superimposed to define a montage on those walls about the flyer(s). Thus, the professional film maker, whether for film, advertising promotions or similar uses, has an inexpensive means of creating any number of action scenes which would otherwise have to be scripted and shot live, with an obvious substantial saving.

While the present system is excellent as a training aid to permit instruction relative to sky diving, it is also a device for having just plain fun. To this end, and in keeping with other aspects of the invention, there is provided at least one false wall 30, which has an inner surface 32, which is exposed to the air stream and which contains at least one, and preferably more, orifice(s), or aperture(s), 34. Individuals, or teams of players, while as flyers within the chamber, may attack and defend opposed goals in the form of apertures, in the manner of the most popular of games, e.g., basketball, hockey, soccer and the like. Since the air stream will necessarily displace the "ball", the game becomes particularly challenging.

It will be appreciated that the goal, and the walls that contain them, are so configured as to minimize interference with the flow of air at the level of the flyers, thus maintaining laminar integrity of the air flow up stream of the players.

It is within the contemplation of the invention that the walls 30 be capable of being moved into and out of position relative to the perimeter wall surface 14.

Having thus described a preferred embodiment of the present invention, what is claimed is:

1. In a free fall simulator wherein a cylindrical primary wall is provided, said primary wall defining a chamber, means for generating a column of air under pressure in said chamber, said column of air moving from bottom to top, the pressure being sufficient to support one or more flyers therein, said primary wall having a surface, said surface being contiguous with and defining the diameter of said column, the surface of said primary wall being smooth such that said column of air moves in laminar flow in at least an upstream portion of said column of air; and pairs of opposed goals are provided within said chamber for use in playing games, said goals being accessible through apertures within the same wall defining said chamber.

* * * * *